United States Patent [19]
Terada et al.

[11] Patent Number: 5,155,329
[45] Date of Patent: Oct. 13, 1992

[54] MONITORING METHOD AND SYSTEM FOR LASER BEAM WELDING

[75] Inventors: Kunio Terada; Osa Matsumoto; Yasumi Nakura; Takashi Ishide, all of Takasago; Tadashi Nagashima; Shigeo Hashimoto, both of Kobe, all of Japan

[73] Assignee: Mitsubishi Jukogyo Kabushiki Kaisha, Tokyo, Japan

[21] Appl. No.: 638,533

[22] Filed: Jan. 8, 1991

[30] Foreign Application Priority Data

Jan. 8, 1990 [JP] Japan .................... 2-607

[51] Int. Cl.⁵ .................... B23K 26/02
[52] U.S. Cl. .................... 219/121.83; 219/121.63; 219/121.64
[58] Field of Search .......... 219/121.83, 121.63, 219/121.64, 121.62, 121.61

[56] References Cited

U.S. PATENT DOCUMENTS

| | | | |
|---|---|---|---|
| 4,502,762 | 3/1985 | Anderson | 350/394 |
| 4,682,594 | 7/1987 | Mok | 219/121.62 X |
| 4,695,697 | 9/1987 | Kosa | 219/121.83 |
| 4,817,020 | 3/1989 | Chande et al. | 364/557 |

FOREIGN PATENT DOCUMENTS 0331891 9/1989 European Pat. Off.
0092482 4/1990 Japan .................... 219/121.83

OTHER PUBLICATIONS

Alavi, M. et al., "Optical Emission During Laser Welding", *Laser und Optoelektronik*, vol. 21, No. 3, pp. 69-72 (Jun. 1989).

Primary Examiner—C. L. Albritton
Attorney, Agent, or Firm—Wenderoth, Lind & Ponack

[57] ABSTRACT

In a method for monitoring laser beam welding, a sequential signal representing a laser oscillating wave form is received, light of a predetermined wavelength in the light emitted from the weld zone is received, and the two signals thus received are processed to determine the minimum intensity of the light of the predetermined wavelength and thereby accurately deduce welding beam input and penetration of welding. An apparatus used in practicing the monitoring method includes a monitoring optical fiber for receiving and transmitting the light emitted from a weld being made on a workpiece, an interference filter for selectively passing light of a predetermine wavelength, and a processing device for determining an intensity of the light of the predetermined wavelength.

6 Claims, 7 Drawing Sheets

MONITORING METHOD AND SYSTEM FOR LASER BEAM WELDING

BACKGROUND OF THE INVENTION

1. Field of the Invention

This invention relates to a method and system for monitoring laser beam welding and more particularly, to a method and apparatus for monitoring the behavior of a laser beam during welding.

2. Description of the Prior Art

Laser beam welding is widely practiced nowadays because welding beam input (energy) can be applied to only a desired weld zone and little thermal influence is imposed in the vicinity thereof. In this regard, to finely complete welding, the welding beam input and resultant depth of penetration of welding must be controlled properly.

It is generally difficult in laser beam welding to directly detect the welding beam input being actually applied to a workpiece. Therefore, as shown in FIG. 11(a), a part of a laser beam 15 generated by a laser oscillator 1 is guided by a quartz plate (semi-transparent mirror) 26 to a photodiode 6 such that the detection output of the photodiode 6 indicates the (laser beam) output of the laser oscillator 1. Conventionally, the behavior of welding is deduced from monitoring the laser beam output of the oscillator.

However, in the foregoing conventional system wherein only the output of the laser oscillator is detected, if the transmission loss of an optical system for transmitting the laser beam from the laser oscillator to a weld zone increases suddenly during welding due to the degradation of optical parts, for example, a large discrepancy arises between the laser beam output and the welding beam input being actually applied to a workpiece; therefore, accurate monitoring cannot be attained as illustrated in FIG. 11(b). Further, even if welding becomes unstable and the depth of penetration is decreased due to a change in the welding conditions, this causes no change in the output of the laser oscillator; therefore, the behavior of the welding beam cannot be properly determined by an operator.

A different system is known in which the behavior of laser beam welding is deduced from monitoring infrared radiation at a weld zone. Specifically, U.S. Pat. No. 4,443,684 (corresponding to Japanese Patent Laid-Open No. 57-124586) discloses a system applicable in the field of laser beam processing, inclusive of welding, which uses a carbon dioxide gas laser as a laser beam source and sends the infrared radiation at a spot under laser beam processing to a detector to obtain the temperature of the spot.

In this U.S. patent, an infrared ray having a wavelength of 10.6 μm is used and the temperature of a weld zone is measured. However, since the infrared ray reaching the detector includes a reflected part of the laser beam and laser plumes appear in the vicinity of a molten pool to cause much infrared radiation, it is difficult to accurately detect the temperature of the weld zone. Further, since the temperature of the weld zone generally does not indicate the welding beam input and the depth of penetration, it is difficult in laser beam welding to monitoring the welding beam input and the depth of penetration on the basis of the detected value of temperature.

SUMMARY OF THE INVENTION

It is an object of the present invention to provide a method for monitoring laser beam welding by which welding beam input and depth of penetration can be deduced with high accuracy from monitoring the intensity of light emission at a weld zone where of a molten pool exists.

It is another object of the present invention to provide an apparatus for monitoring laser beam welding by which welding beam input and depth of penetration can be deduced with high accuracy from monitoring the intensity of light emission at a weld zone.

In a laser beam welding machine wherein a laser beam is transmitted from a laser oscillator through an optical system including an optical fiber and a lens to a weld zone, the present invention continuously detects the light emitted from the weld zone and the laser beam output of the laser oscillator. As is well known in the art, a pulsating laser beam applied to the weld zone causes the emission of light, the emission at the weld zone changes in response to the pulsating laser beam applied, laser plumes present in the weld zone disappear when the laser beam decreases below a base level, i.e. when the application of the laser beam to the weld zone is suspended, and consequently, there remains only the emission of light from a molten pool. The present invention detects the intensity of light of a predetermined wavelength from the emitted light, from which the welding beam input and the depth of penetration can be deduced.

The present inventions have found that there is a certain correlation between the intensity of light of a predetermined wavelength and both the welding beam input and the depth of penetration.

In this invention, the behavior of laser beam welding can be deduced from monitoring the intensity of light of a predetermined wavelength immediately before a rise in intensity of the pulsating laser beam, that is from determining the minimum emission intensity.

The present invention is embodied in the form of an apparatus which comprises a condenser lens for converging the light from a molten pool, a monitoring optical system for transmitting the converged light, an interference filter for selectively passing light of a predetermined wavelength from the light issuing from the optical system, and detecting means for detecting the intensity of the light of a predetermined wavelength passing from the interference filter. An optical line for transmitting the pulsating output of a laser oscillator is also connected to the detecting means.

BRIEF DESCRIPTION OF THE DRAWINGS

FIGS. 11(b) 1 and (b) 2 are graphs showing characteristics of the conventional system.

DETAILED DESCRIPTION OF THE PREFERRED EMBODIMENTS

Embodiments of the present invention will now be described in greater detail with reference to the drawings, which are for a better understanding of the invention and not for limiting purposes.

Figure 1:
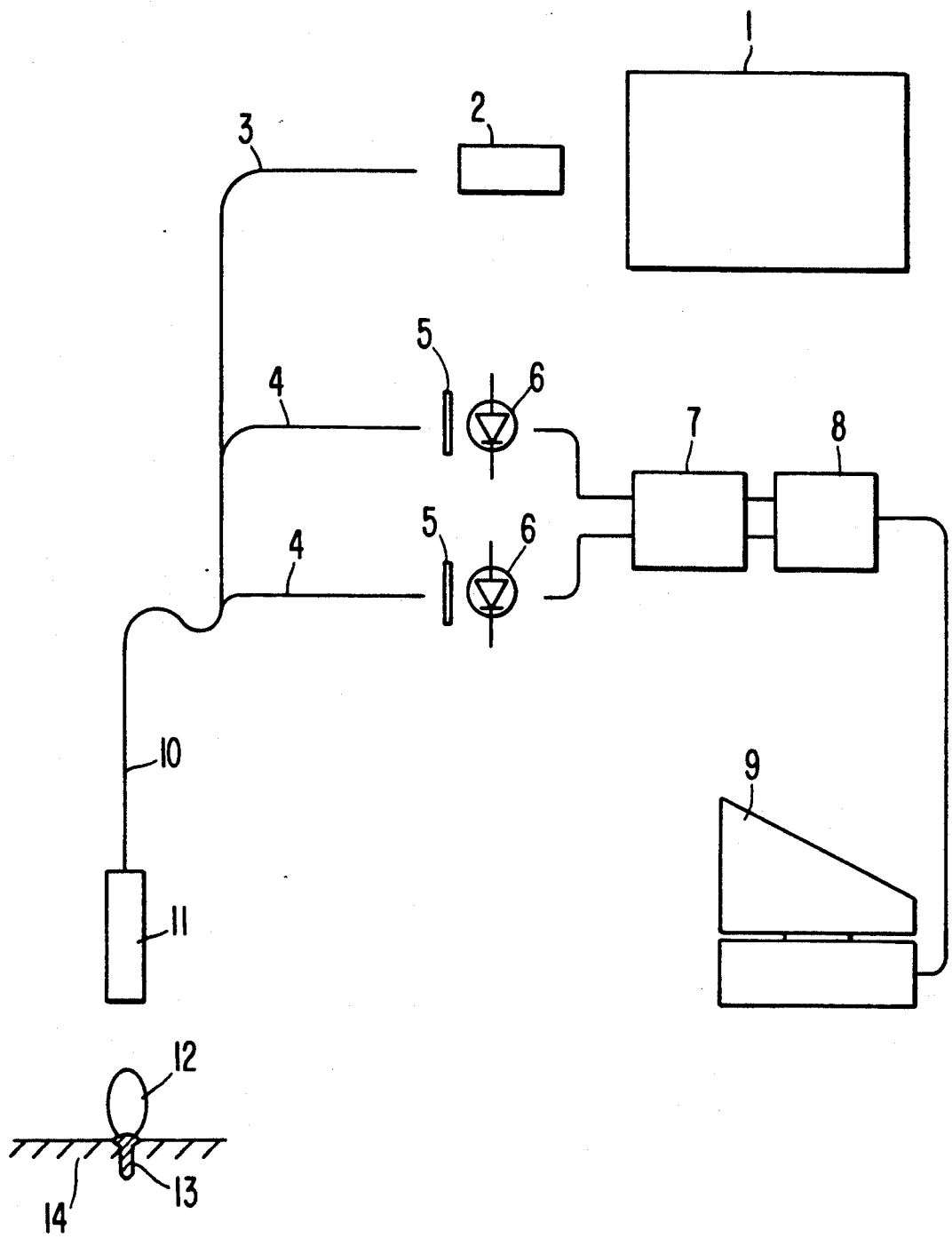
FIG. 1 is a schematic diagram of an embodiment of a laser beam monitoring system according to the present invention.

In FIG. 1, a laser beam generated by a laser oscillator 1 is transmitted through an incident optical system 2 to a laser-beam transmitting optical fiber 3. When the laser oscillator 1 includes a YAG laser, it generates a laser beam having a wavelength of 1.06 $\mu$m. The laser beam after passing through the laser-beam transmitting optical fiber 3 is transmitted to a welding/converging optical system 11, and is thus converged at a weld zone 13 of a workpiece 14. The weld zone 13 absorbs the laser beam and melts, forming a molten pool. When the laser beam is scanned, the molten pool resolidifies, attaining welding. Although not shown, an assist gas such as inert gas is applied to around the weld zone 13 as in the case of ordinary welding. During welding, emission takes place at the weld zone 13 as designated by reference numeral 12.

Figure 2A:
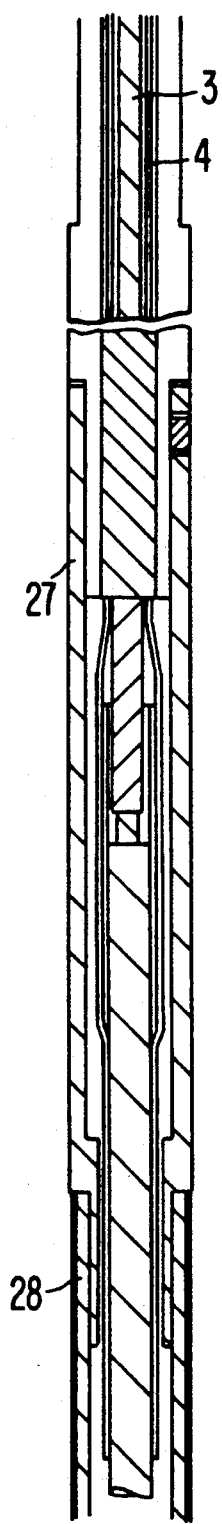
FIGS. 2(a) through (c) are cross-sectional, longitudinal sectional and assembly views of an optical fiber used in the system of FIG. 1, respectively.
Figure 2B:
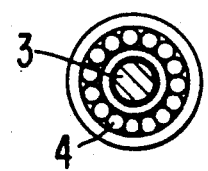
Figure 2C:
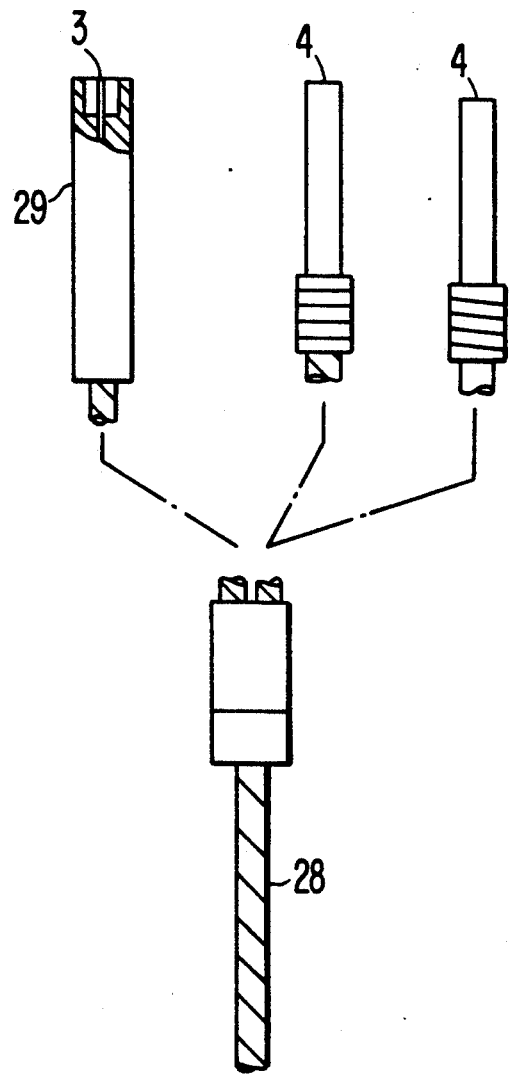

As shown in FIGS. 2(a) through (c), a transmitting-/monitoring optical line 10 is a combination of the laser-beam transmitting optical fiber 3 plus monitoring optical fibers 4. Specifically, as shown in FIG. 2(b), the laser-beam transmitting optical fiber 3 is disposed at the center, the monitoring optical fibers 4 are disposed around the central fiber 3, and the combination of fibers is covered with a metal sheath 27 and a flexible stainless steel (SUS) pipe 28 as shown in FIG. 2(a). The monitoring optical fibers 4 are divided into two bundles (as shown in FIG. 1) each including several fibers, and are connected to interference filters 5 described later. FIG. 2(c) shows such division in greater detail. The optical fiber 3 is partially covered with a copper sleeve 29.

Figure 3:
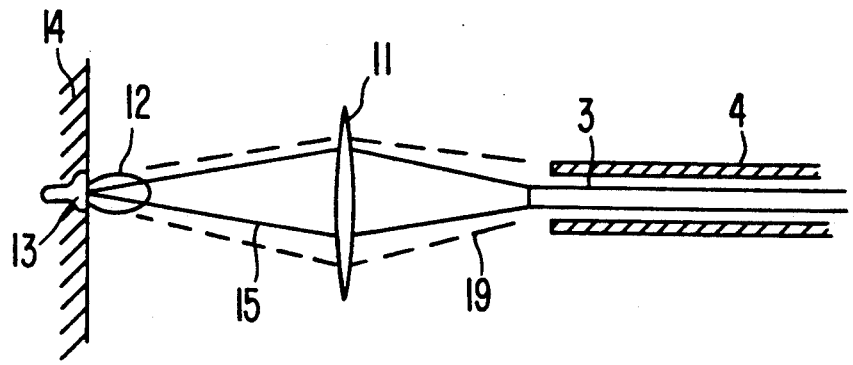
FIG. 3 is a schematic diagram showing the principle of converging the light emitted from a weld zone.

The light from the emission 12 at the weld zone is transmitted through the lens of the welding/converging optical system 11 to the monitoring optical fibers 4 as illustrated in FIG. 3. In FIG. 3, a welding laser beam 15 departing from the end of the central optical fiber 3 diverges slightly, enters the converging optical system 11, and by its condenser lens, is converged on the surface of the workpiece 14. The light from the emission 12 at the weld zone 13, i.e. emitted light 19, is converged by the condenser lens onto the end of the optical fibers 4. Since the optical fibers 4 are circularly arranged, they can effectively receive the emitted light 19 irrespective of the surrounding condition of the weld zone 13. It should be noted that even after the laser beam 15 disappears, the emitted light 19 enters the optical fibers 4 as long as the emission 12 exists.

The interference filter 5 selects a light of a predetermined wavelength, for example, of 0.8 $\mu$m or 0.94 $\mu$m in wave length in the case of "Inconel" welding, and passes the thus selected light to a photodiode 6 where photoelectric transformation is performed. The signal obtained by photoelectric transformation which is representative of the light is amplified by an amplifier 7, converted by an A-D conversion board 8 into digital form, and sent to a computer 9 for signal processing. Although not shown in FIG. 1, the pulsating output wave signal of the laser oscillator 1 is also sent to the computer 9.

Figure 5:
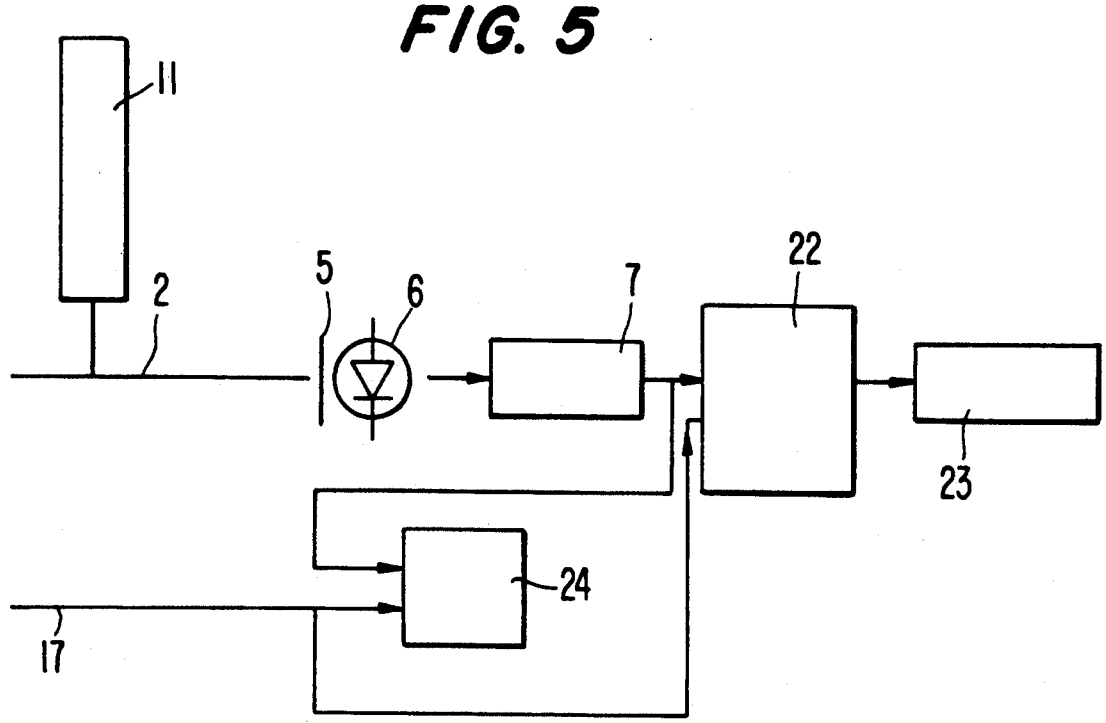
FIG. 5 is a block diagram of a monitoring section of the present invention.

FIG. 5 shows in functional block form a monitoring section of the apparatus shown in FIG. 1. The light passed through each monitoring optical fiber 4 is transmitted through the interference filter 5 to the photodiode 6 whose output is amplified by the amplifier 7 as described above. A signal line 17 for transmitting a signal representative of the pulsating laser beam generated by the laser oscillator 1 is connected to a synchroscope 24 and a data recorder 22. The signal representative of the emission intensity that is amplified by the amplifier 7 is also sent to the data recorder 22 and the synchroscope 24. A memory recorder 23 is used for storing the foregoing signals.

Figure 6:
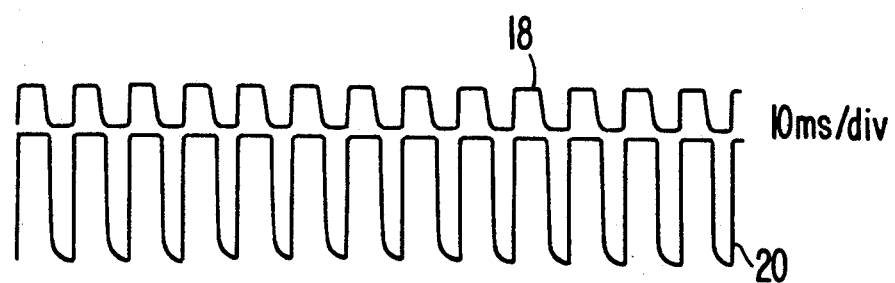
FIG. 6 is a graph showing the relationship between the pulsating output of a laser oscillator and the intensity of emission from a weld zone.

FIG. 6 shows the waveform 18 of the pulsating laser beam and the waveform 20 of the emission intensity at the weld zone, both being recorded in the monitoring section. As will be appreciated, the waveform 20 of the emission intensity at the weld zone corresponds to the intensity of a the light of predetermined wavelength.

Figure 4:
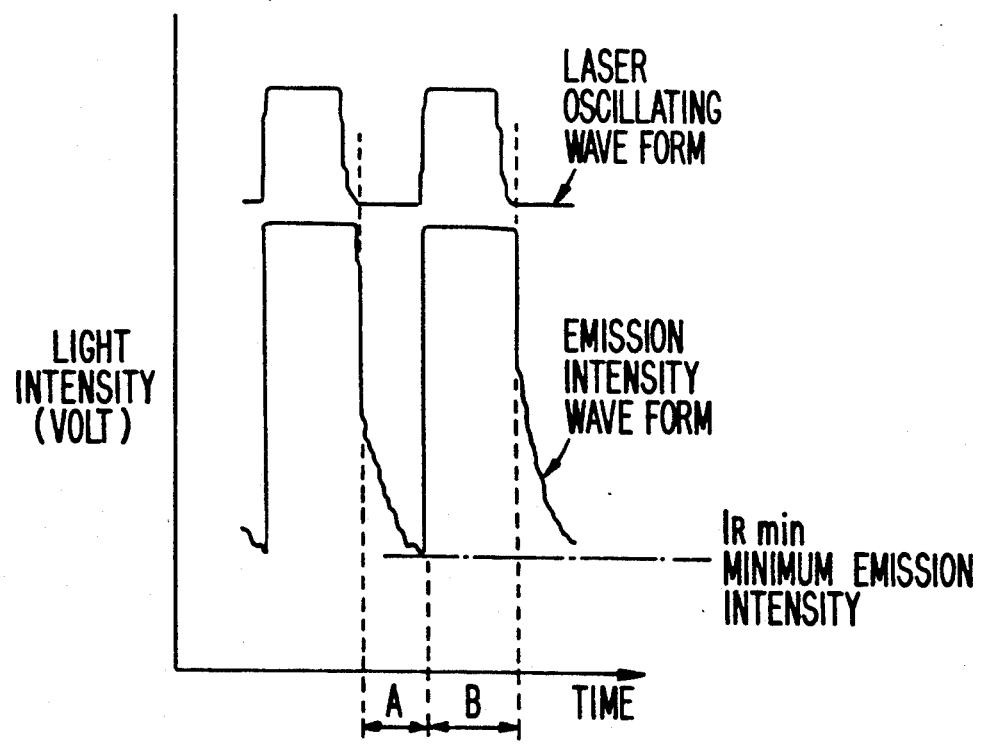
FIG. 4 is a graph showing an emission intensity characteristic during pulsation welding.

FIG. 4 shows the two waveforms of FIG. 6 on an expanded scale. These waveforms are pulsating together, and two intervals of time A and B along the time axis (abscissa) are about 9 msec and about 13 msec, respectively. As will be appreciated from FIG. 4, the waveform of the emission intensity keeps a certain high level while the welding beam input is present (i.e. while the laser beam is irradiating the workpiece), decreases abruptly in a short time after the welding beam input drops, and then rises together with the next pulse of the laser beam.

Figure 7:
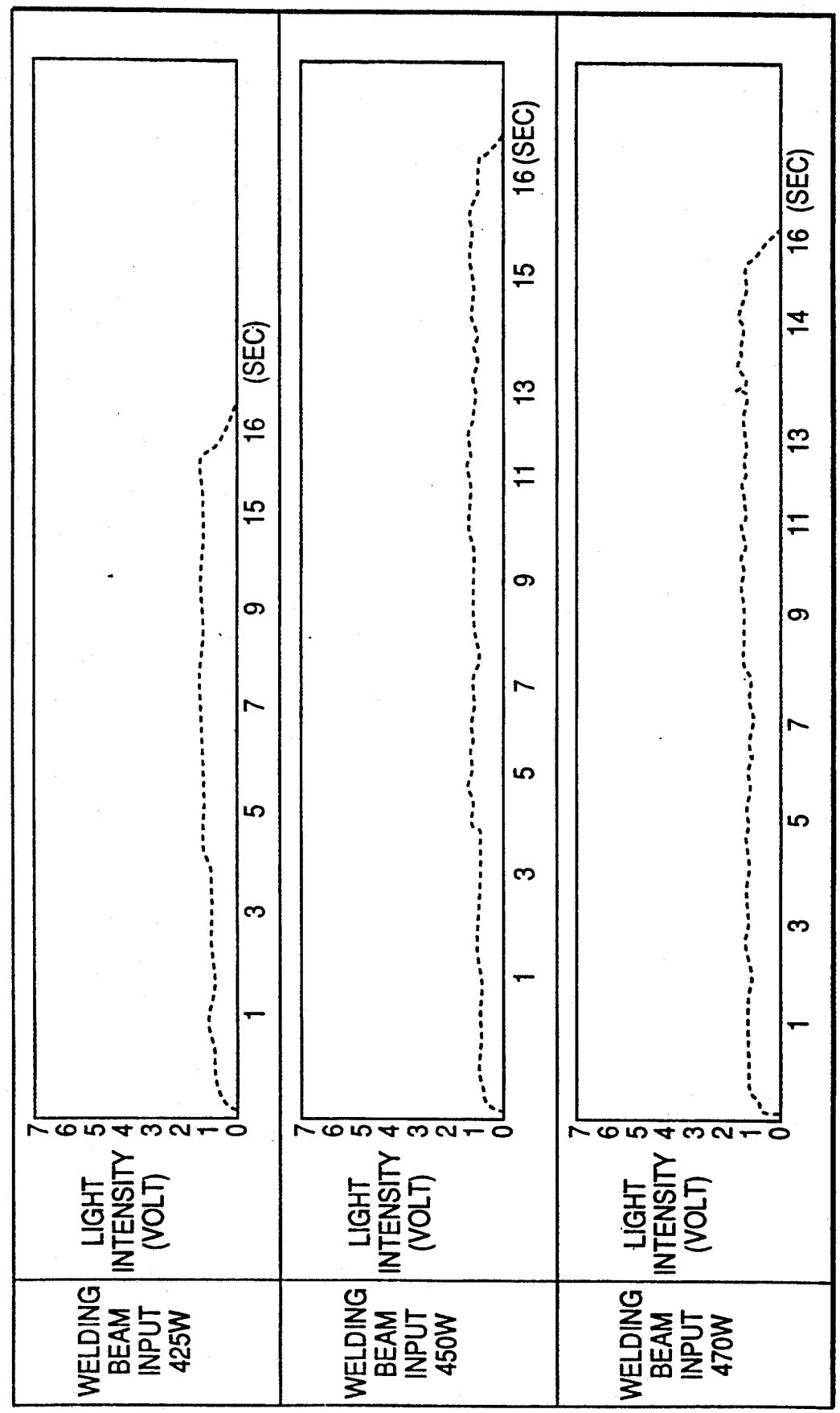
FIG. 7 is a graph showing the measured intensity of emission at a weld zone in relation to welding beam input.

FIG. 7 shows the minimum emission intensity immediately before a subsequent pulse of the laser beam in relation to the welding beam input. Specifically, FIG. 7 shows the change of emission intensity in relation to the welding beam input being 425 W, 450 W and 470 W.

Figure 8:
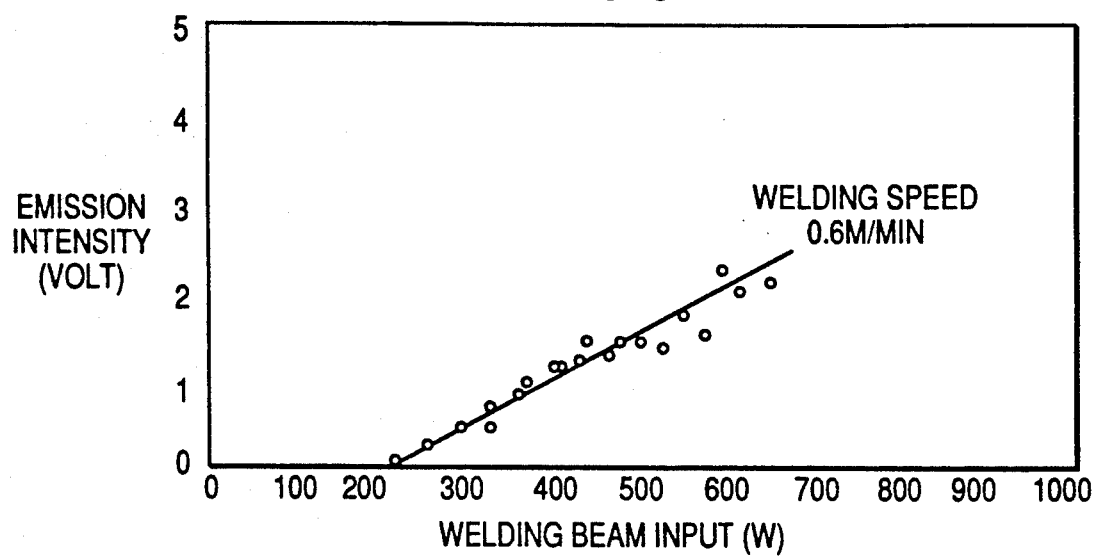
FIG. 8 is a graph showing the correlation between welding beam input and emission intensity.
Figure 9:
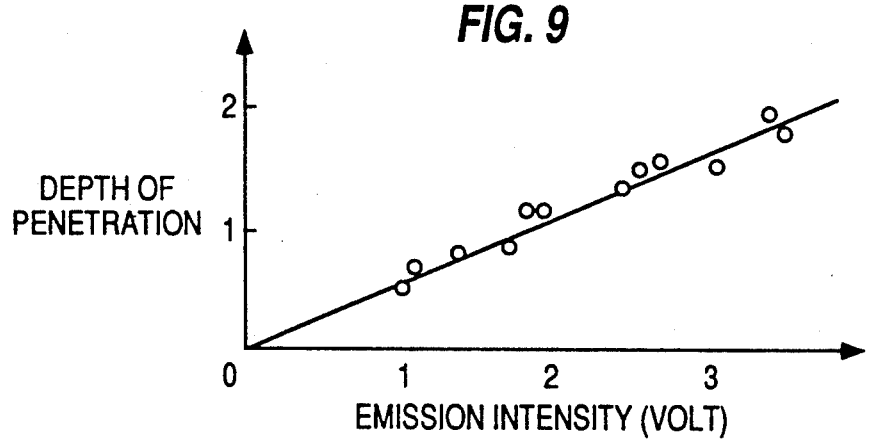
FIG. 9 is a graph showing the correlation between emission intensity and depth of penetration.

FIGS. 8 and 9 show the correlation between the minimum emission intensity of the light of a predetermined wavelength and the welding beam input, and the correlation between the minimum emission intensity and the depth of penetration, respectively. As will be appreciated from these drawings, each correlation is linear; thus, to monitor the minimum emission intensity is equivalent to monitoring the welding beam input as well as the depth of penetration.

Figure 10:
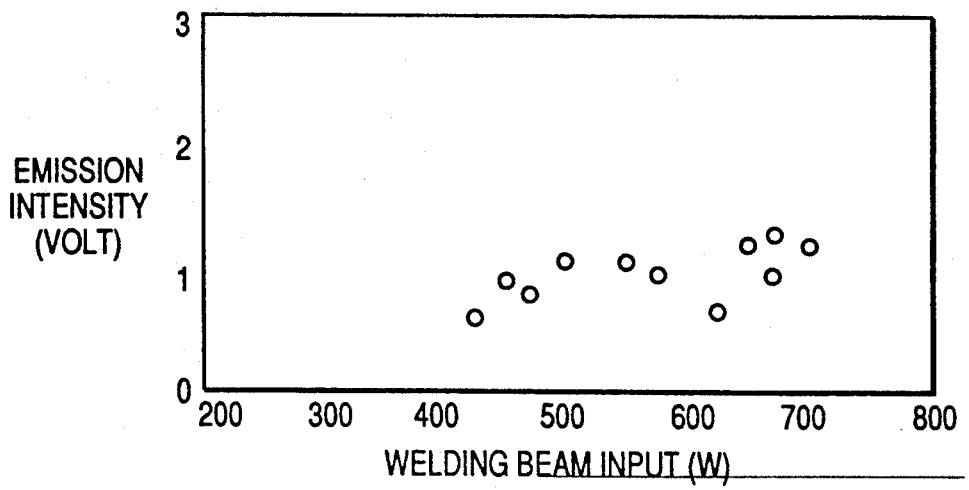
FIG. 10 is a graph showing the emission intensity plotted in relation to the welding beam input where no interference filter is employed.
Figure 11A:
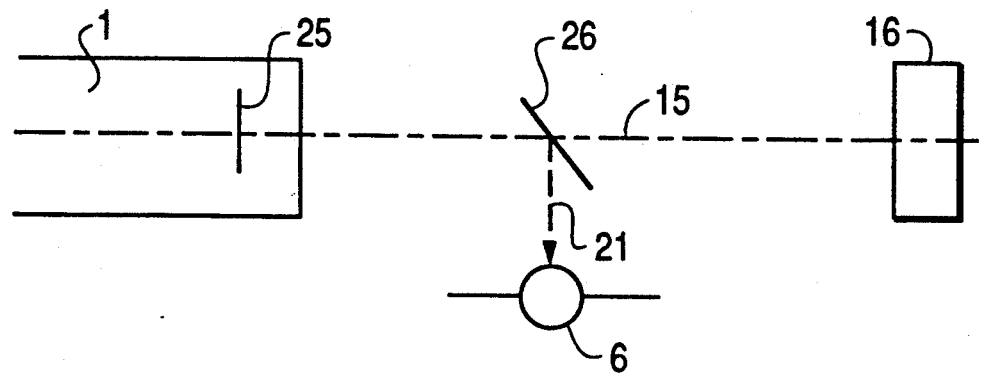
FIG. 11(a) is a schematic diagram of a conventional monitoring system.
Figure 11A:
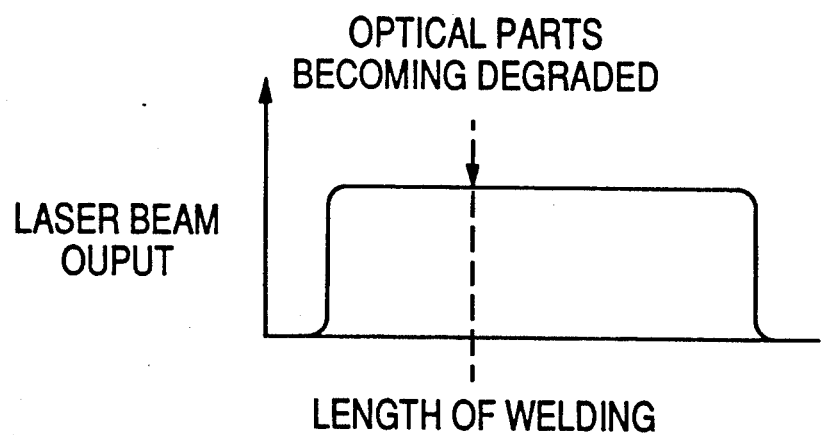
Figure 11A:
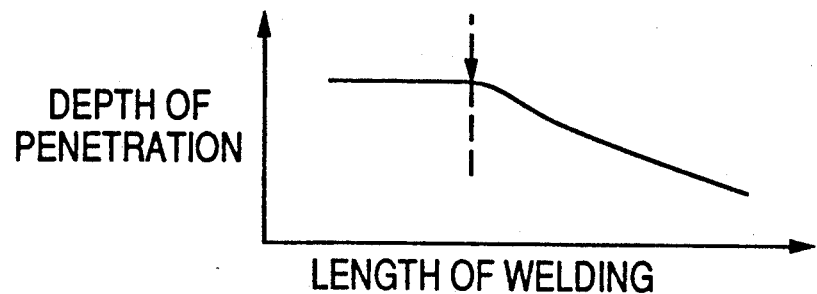

For reference, in FIG. 10, the emission intensity measured without interference filter 5 of FIG. 5 is plotted in relation to the welding beam input. As will be appreciated, no correlation is recognized between these parameters when the interference filter is not employed.

The foregoing predetermined wavelength used in filtering the light emitted at the molten pool can be determined by performing welding testing, spectrum analysis, data processing, etc.

As described above, the present invention can monitor the behavior of laser beam welding by which the welding beam input and the depth of penetration can be precisely deduced.

What we claim are:

1. A method of monitoring laser beam welding, said method comprising the steps of:
   performing welding by irradiating a workpiece with a pulsating laser beam;
   generating signals representative of the pulsating waveform of the laser beam;
   during said welding, continuously monitoring the intensity of light of a predetermined wavelength emitted from a zone of the workpiece at which said welding is being performed;
   generating signals representative of the intensity of said light of a predetermined wavelength; and
   processing said signals representative of both the pulsating waveform of the laser beam and of the intensity of said light of a predetermined wavelength to determine the minimum intensity of said light of a predetermined wavelength that is being emitted from the weld zone during said welding.

2. A method of monitoring laser beam welding as claimed in claim 1, wherein said step of monitoring comprises filtering the light emitted from the weld zone except for said light of a predetermined wavelength.

3. A method of monitoring laser beam welding as claimed in claim 1, and further comprising correlating the determined minimum intensity of said light of a predetermined wavelength to a condition at the weld zone including at least one of the energy of the laser beam at the weld zone and the depth to which the laser beam penetrates the workpiece at the weld zone.

4. Apparatus for monitoring laser beam welding, said apparatus comprising:
   a monitoring optical fiber capable of receiving and transmitting light therealong;
   an interference filter optically coupled to said fiber, said filter filtering light transmitted by said fiber except for light of a predetermined wavelength;
   photodiode means operatively associated with said interference filter for transforming the light of a predetermined wavelength passing through the filter into signals representative of the intensity thereof; and
   a processor operatively connected to said photodiode means so as to receive the signals produced thereby, said processor including processing means for processing said signals to discriminate the minimum intensity of the light passing through said filter during a given time period.

5. An apparatus for monitoring laser beam welding as claimed in claim 4, and further comprising a laser beam transmitting optical fiber assembled with said monitoring optical fiber into a single bundle of fibers, and an optical system optically coupled to said single bundle of fibers, said optical system having focal points located proximate the end of said monitoring optical fiber and spaced from said single bundle of fibers, respectively.

6. An apparatus for monitoring laser beam welding as claimed in claim 4, and further comprising laser oscillator means for emitting a pulsating laser beam and for generating signals representative of the waveform of the laser beam emitted thereby, and wherein said processor is operatively connected to said laser oscillator means so as to receive the signals representative of the waveform of the laser beam emitted by the laser oscillator means, and said processing means processes said signals representative of the waveform of the laser beam emitted by said laser oscillator means along with said signals produced by the photodiode means to determine the minimum intensity of the light passing through said filter during a given period of time.

* * * * *